United States Patent
Shim et al.

(10) Patent No.: US 12,504,609 B2
(45) Date of Patent: Dec. 23, 2025

(54) OPTICAL SYSTEM AND CAMERA MODULE COMPRISING SAME

(71) Applicant: LG INNOTEK CO., LTD., Seoul (KR)

(72) Inventors: Ju Yong Shim, Seoul (KR); Tae Kyung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 397 days.

(21) Appl. No.: 17/920,222

(22) PCT Filed: Apr. 21, 2021

(86) PCT No.: PCT/KR2021/004973
§ 371 (c)(1),
(2) Date: Oct. 20, 2022

(87) PCT Pub. No.: WO2021/215806
PCT Pub. Date: Oct. 28, 2021

(65) Prior Publication Data
US 2023/0176347 A1    Jun. 8, 2023

(30) Foreign Application Priority Data

Apr. 21, 2020 (KR) .................. 10-2020-0048018

(51) Int. Cl.
*G02B 15/14* (2006.01)
(52) U.S. Cl.
CPC .................. *G02B 15/144* (2019.08)
(58) Field of Classification Search
CPC .......... G02B 15/144; G02B 15/144111; G02B 15/144511; G02B 15/20; G02B 15/1441;
(Continued)

(56) References Cited

U.S. PATENT DOCUMENTS 4,110,006 A   8/1978  Ikemori
5,448,412 A   9/1995  Maruyama et al.
(Continued)

FOREIGN PATENT DOCUMENTS

EP    2 045 637 B1    7/2019
JP    2010-60919 A    3/2010
(Continued)

OTHER PUBLICATIONS

Sony Semiconductor Solutions Corporation, IMX367LQJ, 2018, Sony; pp. 1-2. (Year: 2018) https://www.sony-semicon.com/files/62/flyer_industry/IMX367LQA_Flyer.pdf.*

*Primary Examiner* — Zachary W Wilkes
*Assistant Examiner* — Elizabeth M Hall
(74) *Attorney, Agent, or Firm* — Birch, Stewart, Kolasch & Birch, LLP

(57) ABSTRACT

A zoom optical system according to an embodiment of the present invention comprises a first lens group, a second lens group, a third lens group, and a fourth lens group which are sequentially arranged in a direction from a subject side to an image side, wherein each of the first lens group to the fourth lens group includes at least two lenses, the second lens group and the third lens group are movable, and an effective focal length (EFL) in a wide angle mode is defined by an expression below.

$$5.5 < \frac{EFL_{wide}}{H_{imageD}} < 6.5.$$

Here, $EFL_{wide}$ is the EFL of the zoom optical system in the wide angle mode, and $H_{imageD}$ is a half value of a diagonal length of a pixel area of an image sensor.

16 Claims, 9 Drawing Sheets

(58) Field of Classification Search
CPC .... G02B 15/144101; G02B 15/144103; G02B 15/144105; G02B 15/144107; G02B 15/144109; G02B 15/144112; G02B 15/144115; G02B 15/1445; G02B 15/144501; G02B 15/144503; G02B 15/144505; G02B 15/144507; G02B 15/144509; G02B 15/144513; G02B 15/144515
USPC ........................................ 359/676, 683, 686
See application file for complete search history.

(56) References Cited

U.S. PATENT DOCUMENTS

| | | |
|---|---|---|
| 5,671,062 A | 9/1997 | Nakamura |
| 2002/0191304 A1 | 12/2002 | Kitaoka et al. |
| 2003/0133200 A1* | 7/2003 | Sato ................. G02B 27/646 |
| | | 359/686 |
| 2009/0141365 A1 | 6/2009 | Jannard et al. |
| 2009/0296231 A1* | 12/2009 | Shirasuna ...... G02B 15/143105 |
| | | 359/683 |
| 2009/0303596 A1 | 12/2009 | Ryu |
| 2011/0228407 A1* | 9/2011 | Yamaguchi .... G02B 15/144113 |
| | | 359/687 |
| 2012/0229689 A1* | 9/2012 | Saori ............. G02B 15/144113 |
| | | 348/335 |
| 2012/0307371 A1* | 12/2012 | Takamoto ...... G02B 15/145129 |
| | | 359/649 |
| 2015/0130961 A1 | 5/2015 | Sudoh |
| 2020/0201023 A1 | 6/2020 | Kishi |

FOREIGN PATENT DOCUMENTS

| | | |
|---|---|---|
| JP | 2011-197302 A | 10/2011 |
| JP | 2012-27217 A | 2/2012 |
| JP | 2015-90379 A | 5/2015 |
| JP | 2015-102646 A | 6/2015 |
| KR | 10-1992-0022034 A | 12/1992 |
| KR | 10-2010-0082785 A | 7/2010 |
| KR | 10-2015-0007848 A | 1/2015 |
| WO | WO 2014/030304 A1 | 2/2014 |
| WO | WO 2019/012794 A1 | 1/2019 |
| WO | WO-2021101158 A1 * | 5/2021 ......... G02B 13/0005 |

* cited by examiner

[FIG. 1]
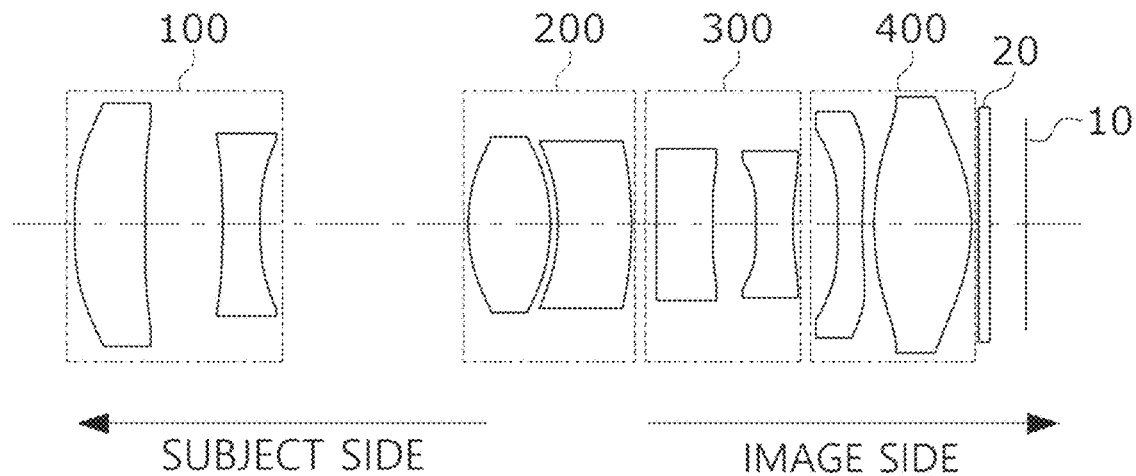
[FIG. 2A]
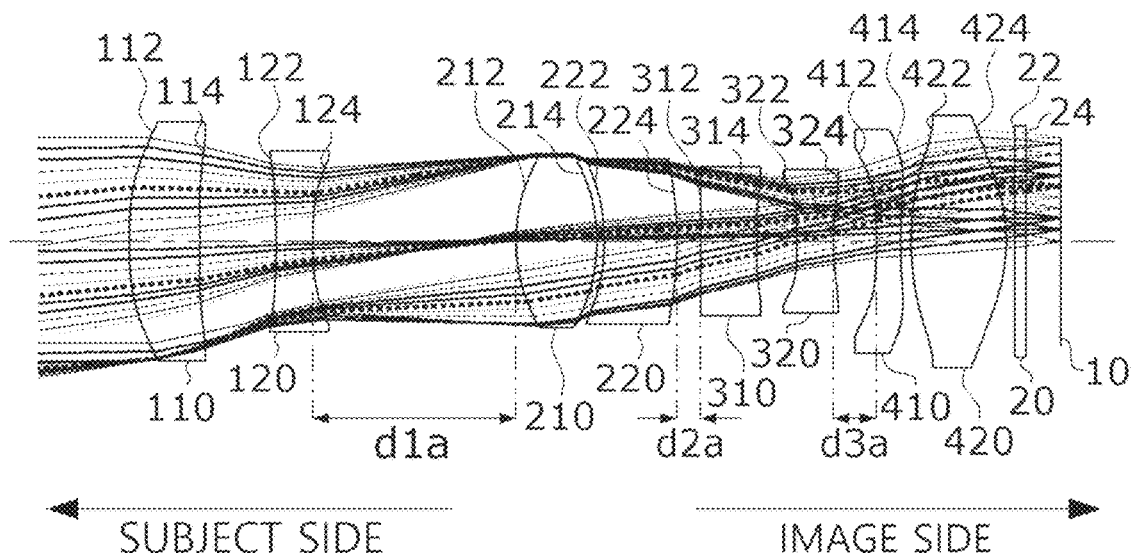

[FIG. 2B]
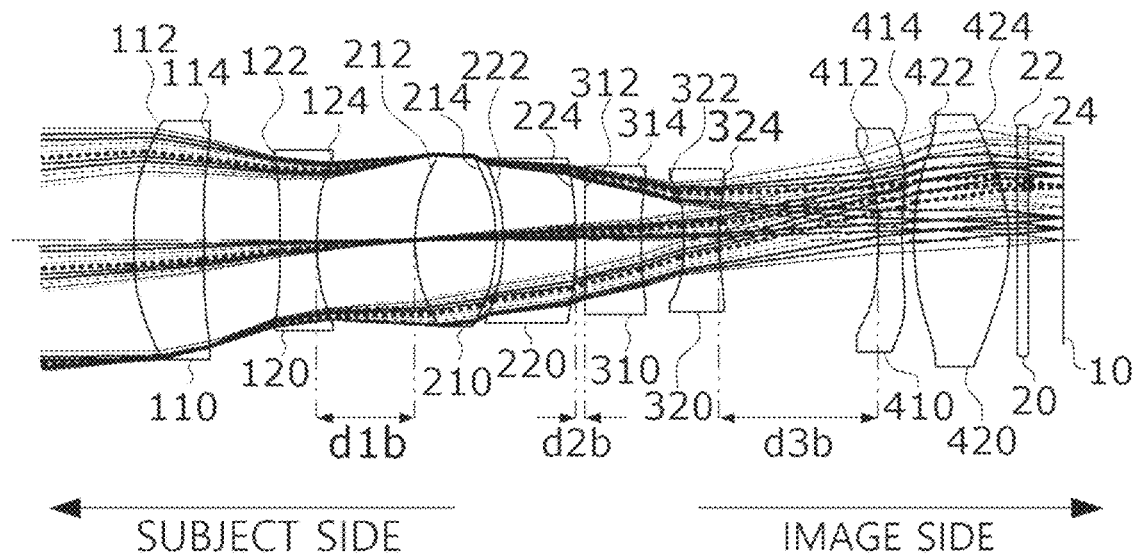
[FIG. 2C]
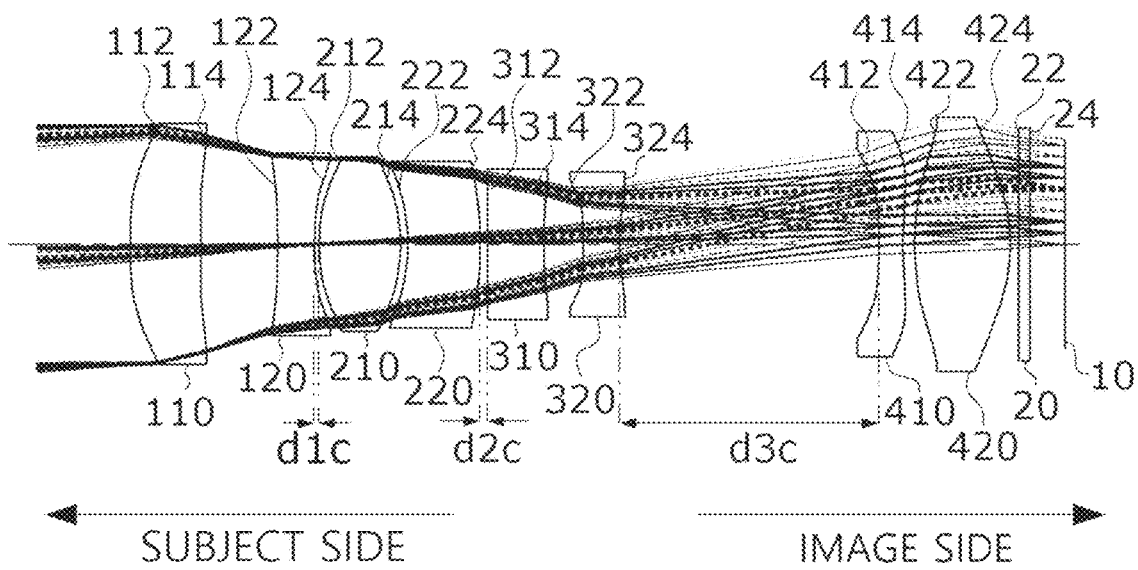

[FIG. 3A]
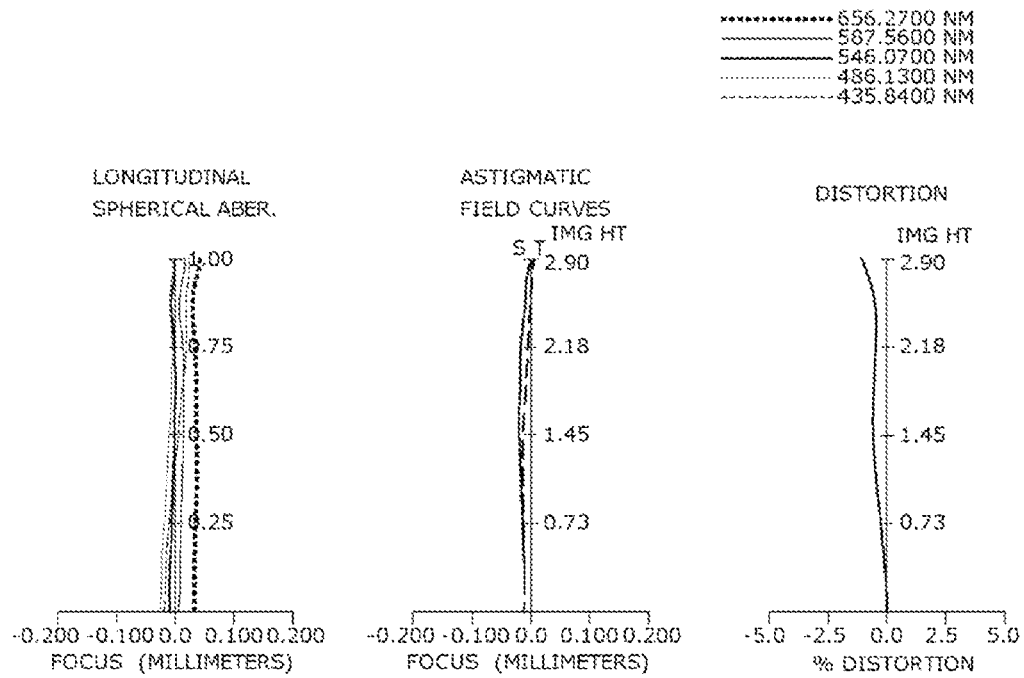
[FIG. 3B]
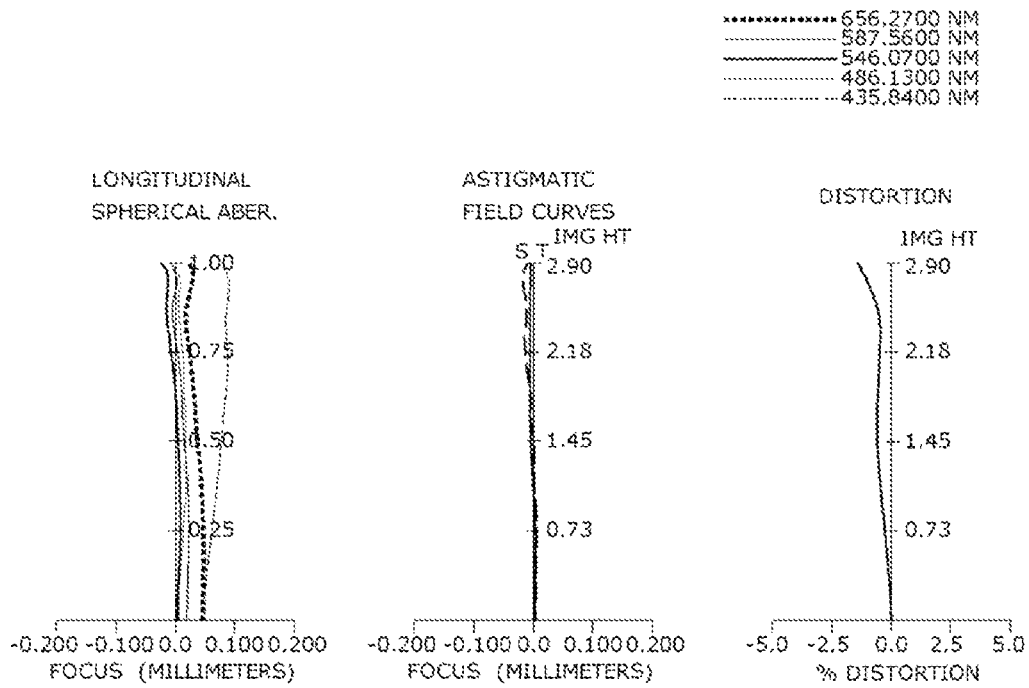

[FIG. 3C]
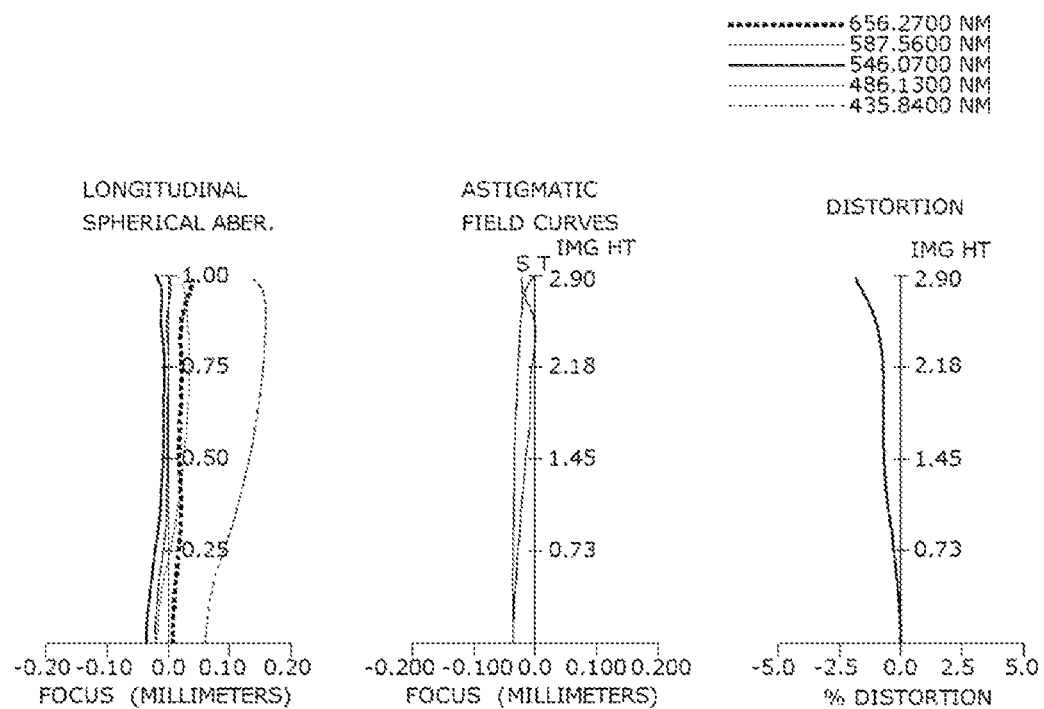

[FIG. 4A]
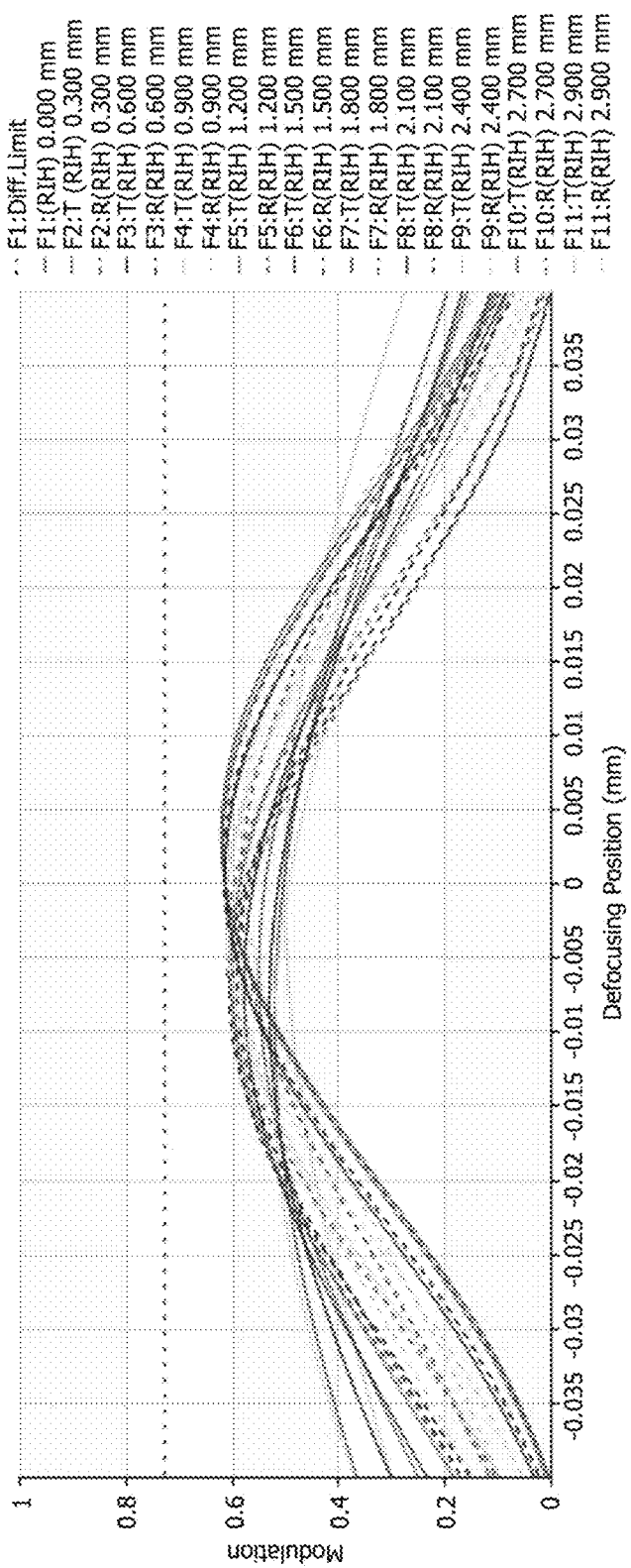

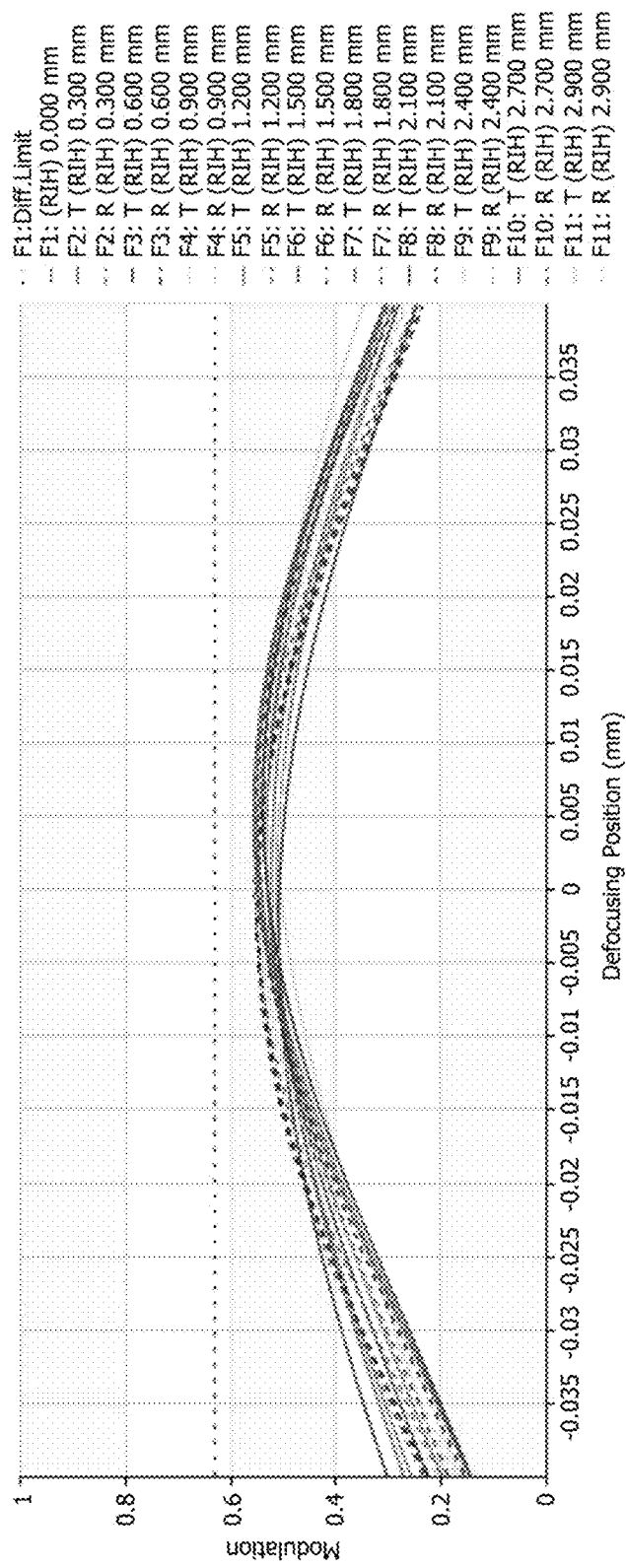
[FIG. 4B]

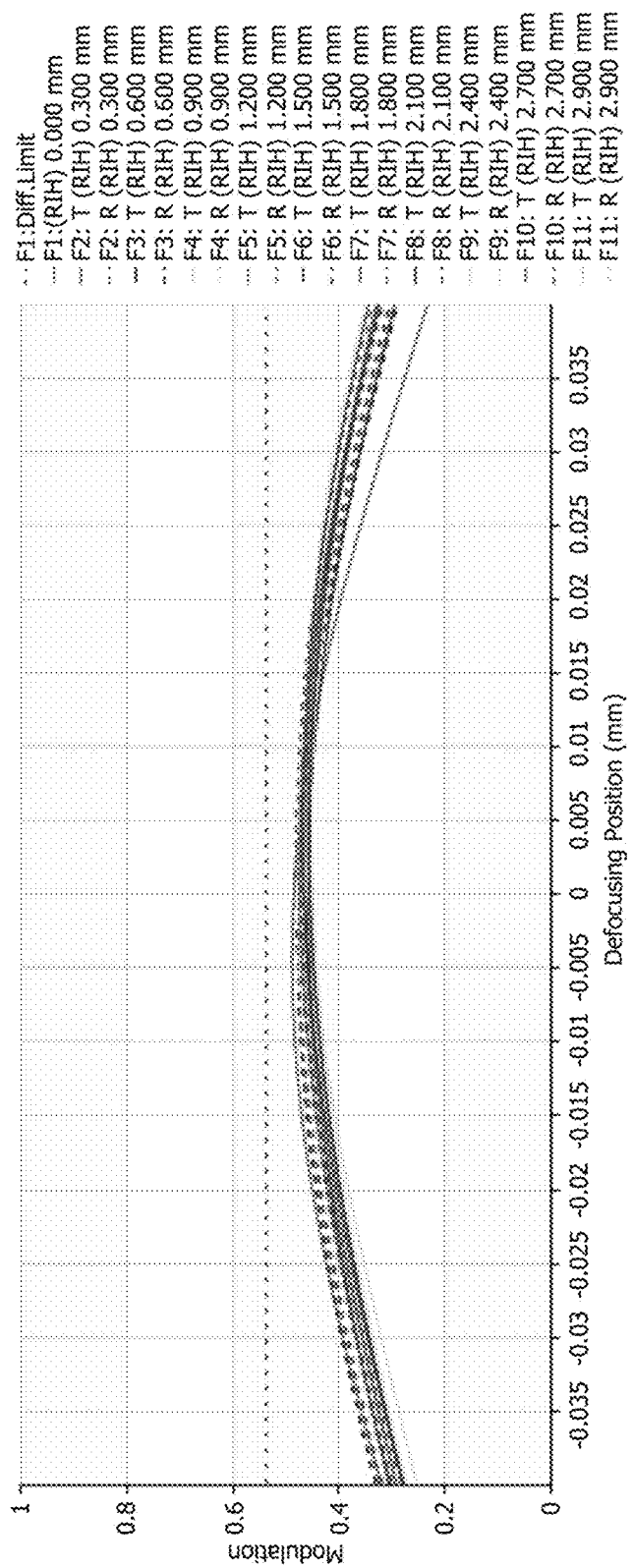
[FIG. 4C]

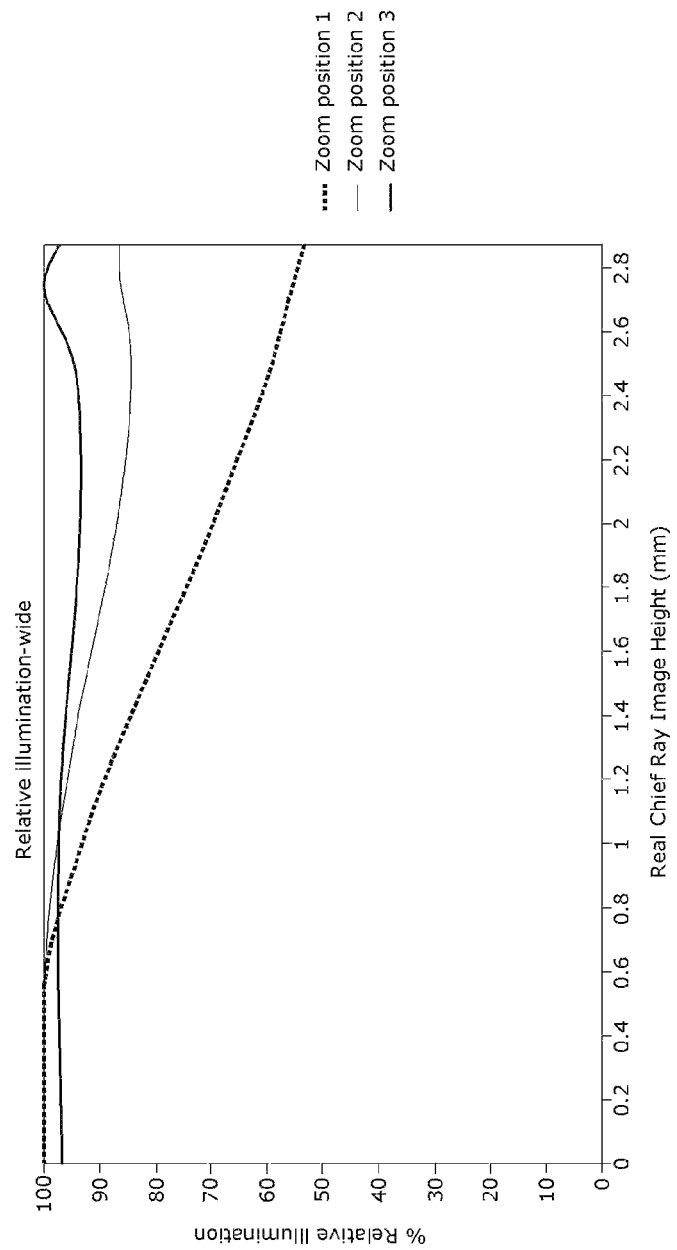
[FIG. 5]

[FIG. 6]
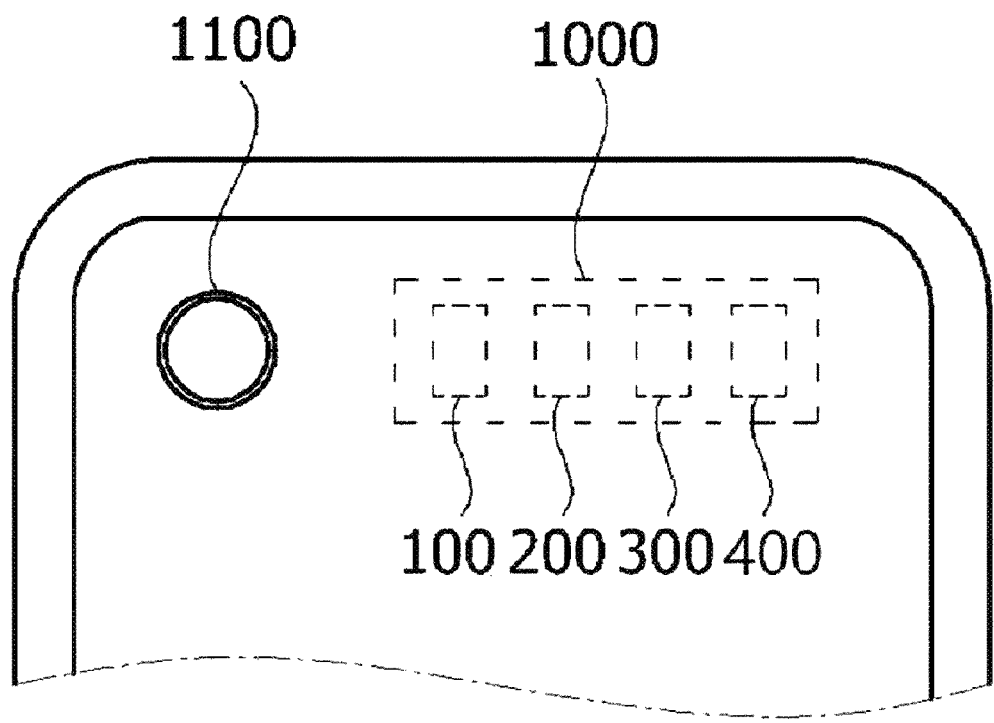

OPTICAL SYSTEM AND CAMERA MODULE COMPRISING SAME

CROSS REFERENCE TO RELATED APPLICATIONS

This application is the National Phase of PCT/KR2021/004973 filed on Apr. 21, 2021, which claims priority under 35 U.S.C. § 119 (a) to Patent Application No. 10-2020-0048018 filed in the Republic of Korea on Apr. 21, 2020, all of which are hereby expressly incorporated by reference into the present application.

TECHNICAL FIELD

An embodiment relates to an optical system and a camera module including the same.

BACKGROUND ART

With the development of the performance of a camera module embedded in a portable terminal, an auto-focusing function is required for even the camera module in the portable terminal.

In a process of converting external light to a digital image or digital video in order that a camera module in a portable terminal has an auto-focusing function, a magnification can be increased through a digital process. Accordingly, it is possible to zoom only at a predetermined magnification such as 1×, 3×, and 5×, and as magnification increase, resolution decreases and digital degradation occurs.

Meanwhile, in order that a camera module in a portable terminal has an auto-focusing function, a technology of moving a lens to adjust a distance between the lens and an image sensor has been tried. However, it is not easy to design an optical system that is movable in a small space in a portable terminal.

Technical Problem

Technical objective to be achieved through the present invention is to provide a zoom optical system and a camera module including the same.

Objectives to be solved by embodiments are not limited thereto and will include purposes or effects which may be understood from the technical solution or modes of invention described below.

Technical Solution

One aspect of the present invention provides a zoom optical system including a first lens group, a second lens group, a third lens group, and a fourth lens group which are sequentially arranged in a direction from a subject side to an image side, wherein each of the first lens group to the fourth lens group includes at least two lenses, the second lens group and the third lens group are movable, and an effective focal length (EFL) in a wide angle mode is defined by an expression below.

$$5.5 < \frac{EFL_{wide}}{H_{imageD}} < 6.5$$

Here, $EFL_{wide}$ is the EFL of the zoom optical system in the wide angle mode, and $H_{imageD}$ is a half value of a diagonal length of a pixel area of an image sensor.

The first lens group may include two or more lenses, the second lens group may include two or more lenses, the third lens group may include two or more lenses, and the fourth lens group may include two lenses.

An EFL in a telephoto mode may be defined by an expression below.

$$11.5 < \frac{EFL_{tele}}{H_{imageD}} < 12.5$$

Here, $EFL_{tele}$ is the EFL of the zoom optical system in the telephoto mode, and $H_{imageD}$ is the half value of the diagonal length of the pixel area of the image sensor.

When zooming is performed from the wide angle mode to a telephoto mode, a movement stroke of the second lens group may be defined by an expression below.

$$4 < \frac{TTL}{STROKE_2} < 8$$

Here, TTL (total track length) is a distance from a surface of the image sensor to a first surface of the zoom optical system, and $STROKE_2$ is the movement stroke of the second lens group.

When zooming is performed from the wide angle mode to a telephoto mode, a movement stroke of the third lens group may be defined by an expression below.

$$4 < \frac{TTL}{STROKE_3} < 8$$

Here, TTL (total track length) is a distance from a surface of the image sensor to a first surface of the zoom optical system, and $STROKE_3$ is the movement stroke of the third lens group.

A lens disposed at the image side of two lenses included in the first lens group may have positive refractive power, and the lens disposed at the subject side of the two lenses included in the first lens group may have negative refractive power.

The at least two lenses included in the second lens group may have abbe numbers defined by an expression below.

$$|ABBE_3 - ABBE_4| > 10$$

Here, $ABBE_3$ is an abbe number of a lens disposed at the subject side of two lenses included in the second lens group, and $ABBE_4$ is an abbe number of the lens disposed at the image side of the two lenses included in the second lens group.

The second lens group may include at least one of a glass lens and a plastic lens.

a maximum diameter of the plurality of lenses included in the first lens group and the fourth lens group and a maximum diameter of the plurality of lenses included in the second lens group and the third lens group are defined by an expression below.

$$1.1 < \frac{APER_{fix}}{APER_{mov}} < 1.4$$

Here, $APER_{fix}$ is the maximum diameter of the lenses included in the first lens group and the fourth lens group which are fixed groups, and $APER_{mov}$ is the maximum diameter of the lenses included in the second lens group and the third lens group which are moving groups.

A chief ray angle (CRA) may be greater than −10° and smaller than 10°.

The zoom optical system may further include a right-angled prism disposed in front of the first lens group.

Another aspect of the present invention provides a zoom optical system including a first lens group, a second lens group, a third lens group, and a fourth lens group which are sequentially arranged in a direction from a subject side to an image side, wherein each of the first lens group to the fourth lens group includes at least two lenses, the second lens group and the third lens group are movable, and an EFL in a telephoto mode is defined by an expression below.

$$11.5 < \frac{EFL_{tele}}{H_{imageD}} < 12.5$$

Here, $EFL_{tele}$ is the EFL of the zoom optical system in the telephoto mode, and $H_{imageD}$ is a half value of a diagonal length of a pixel area of an image sensor.

Still another aspect of the present invention provides a zoom optical system including a first lens group, a second lens group, a third lens group, and a fourth lens group which are sequentially arranged in a direction from a subject side to an image side, wherein the first lens group and the fourth lens group are fixed, the second lens group and the third lens group are movable, the second lens group serves a zoom function, the third lens group serves a focusing function, the second lens group includes a first lens and a second lens, and a difference in abbe number between the first lens and the second lens is 10 or more.

Yet another aspect of the present invention provides a zoom optical system including a first lens group, a second lens group, a third lens group, and a fourth lens group which are sequentially arranged in a direction from a subject side to an image side, wherein the first lens group and the fourth lens group are fixed, the second lens group and the third lens group are movable, the second lens group serves a zoom function, the third lens group serves a focusing function, an image side surface of a first lens disposed closest to the image side of lenses included in the first lens group is concave, a subject side surface of a second lens disposed closest to the subject side of lenses included in the second lens group is convex, and when a distance between the first lens group and the second lens group is a minimum distance, a curvature center of the subject side surface of the second lens is positioned closer to the image side than two ends of the image side surface of the first lens.

Advantageous Effects

According to embodiments of the present invention, an optical system capable of zooming at not only a low magnification but also a high magnification and a camera module including the same can be obtained. In the optical system according to the embodiments of the present invention, zooming can be continuously adjusted, and a high resolution can be maintained even at the high magnification.

DESCRIPTION OF DRAWINGS

FIG. 1 is a view showing a zoom optical system according to an embodiment of the present invention.

FIG. 2A is a cross-sectional view of the zoom optical system in a wide angle mode according to the embodiment of the present invention.

FIG. 2B is a cross-sectional view of the zoom optical system in a middle mode according to the embodiment of the present invention.

FIG. 2C is a cross-sectional view of the zoom optical system in a telephoto mode according to the embodiment of the present invention.

FIG. 3A is a graph showing longitudinal spherical aberrations, astigmatic field curves, and a distortion of light of wavelengths of 435 nm, 486 nm, 546 nm, 587 nm, and 656 nm in the optical system in the wide angle mode according to the embodiment.

FIG. 3B is a graph showing the longitudinal spherical aberrations, the astigmatic field curves, and the distortion of light of wavelengths of 435 nm, 486 nm, 546 nm, 587 nm, and 656 nm in the optical system in the middle mode according to the embodiment.

FIG. 3C is a graph showing the longitudinal spherical aberrations, the astigmatic field curves, and the distortion of light of wavelengths of 435 nm, 486 nm, 546 nm, 587 nm, and 656 nm in the optical system in the telephoto mode according to the embodiment.

FIG. 4A is a graph showing a diffraction modulation transfer function (MTF) in the optical system in the wide angle mode according to the embodiment.

FIG. 4B is a graph showing the diffraction MTF in the optical system in the middle mode according to the embodiment.

FIG. 4C is a graph showing the diffraction MTF in the optical system in the telephoto mode according to the embodiment.

FIG. 5 is a graph showing a relative illumination of the zoom optical system according to the embodiment of the present invention.

FIG. 6 is a view of a part of a portable terminal to which a camera module according to one embodiment of the present invention is applied.

MODES OF THE INVENTION

Hereinafter, exemplary embodiments of the present invention will be described in detail with reference to the accompanying drawings.

However, the technical spirit of the present invention is not limited to some embodiments which will be described and may be implemented using various other embodiments, and at least one component of the embodiments may be selectively coupled, substituted, and used within the range of the technical spirit of the present invention.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted in consideration of contextual meanings of the related technology.

In addition, the terms used in the embodiments of the present invention are considered in descriptive senses and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include not only a case in which the element is directly connected or coupled to another element, but also a case in which the element is connected or coupled to another element with still another element disposed therebetween.

In addition, in a case in which any one element is described as being formed or disposed "on or under" another element, such a description includes not only a case in which the two elements are formed or disposed to be in direct contact with each other, but also a case in which one or more other elements are interposed between the two elements. In addition, when one element is described as being formed "on or under" another element, such a description may include not only a case in which the one element is formed at an upper side, but also a case in which the element is formed at a lower side with respect to another element. FIG. 1 is a view showing a zoom optical system according to an embodiment of the present invention.

Referring to FIG. 1, the zoom optical system according to the embodiment of the present invention may include a first lens group 100, a second lens group 200, a third lens group 300, and a fourth lens group 400 which are sequentially arranged in a direction from a subject side to an image side. A right-angled prism may be further disposed in front of the first lens group 100. In this case, the zoom optical system may include the right-angled prism, the first lens group 100, the second lens group 200, the third lens group 300, and the fourth lens group 400 which are sequentially arranged in the direction from the subject side to the image side.

According to the embodiment of the present invention, the first lens group 100 includes a plurality of lenses. The first lens group 100 may include at least two lenses. When the first lens group 100 includes one lens, it may be difficult to correct a resolution at a maximum magnification, and when the first lens group 100 includes three or more lenses, an overall size of the zoom optical system may increase, and accordingly, the first lens group 100 may preferably include two lenses.

The first lens group 100 is fixed with respect to the image side. The first lens group 100 is fixed with respect to a surface of a sensor 10. That is, the plurality of lenses are fixed with respect to the image side. When the first lens group 100 includes three lenses, two lenses may be fixed with respect to the image side.

The second lens group 200 includes a plurality of lenses. The second lens group 200 may include at least two lenses. When the second lens group 200 includes one lens, it may be difficult to correct the resolution at the maximum magnification, and when the second lens group 200 includes three or more lenses, the overall size of the zoom optical system may increase, and accordingly, the second lens group 200 may preferably include two lenses.

The second lens group 200 is movable. All of the plurality of lenses included in the second lens group 200 may move along a central axis of the lenses. Both of two lenses included in the second lens group 200 may move along the central axes of the lenses. When the second lens group 200 includes three or more lenses, a size and a weight of the second lens group 200 increase, and driving power may increase when the second lens group 200 moves. Accordingly, the second lens group 200 may include two lenses. A focal length may be continuously adjusted according to the movement of the second lens group 200. As the second lens group 200 moves, a magnification may be continuously adjusted. Accordingly, the second lens group 200 may serve as a zooming group.

The third lens group 300 includes a plurality of lenses. The third lens group 300 may include at least two lenses. When the third lens group 300 includes one lens, it may be difficult to correct the resolution at the maximum magnification, and when the third lens group 300 includes three or more lenses, the overall size of the zoom optical system may increase, and accordingly, the third lens group 300 may preferably include two lenses.

The third lens group 300 is movable. All of the plurality of lenses included in the third lens group 300 are movable along a central axis of the lenses. Both of two lenses included in the third lens group 300 are movable along the central axes of the lenses. When the third lens group 300 includes three or more lenses, a size and a weight of the third lens group 300 increase, and driving power may increase when the third lens group 300 moves. Accordingly, the third lens group 300 may include two lenses. As the third lens group 300 moves, a focus may be adjusted. The third lens group 300 may serve as a focusing group.

The fourth lens group 400 includes a plurality of lenses. The fourth lens group 400 includes at least two lenses. When the fourth lens group 400 includes one lens, it may be difficult to correct the resolution at the maximum magnification, and when the fourth lens group 400 includes three or more lenses, the overall size of the zoom optical system may increase, and accordingly, the fourth lens group 400 may preferably include two lenses.

The fourth lens group 400 is fixed with respect to the image side. The fourth lens group 400 is fixed with respect to the surface of the sensor 10. That is, the plurality of lenses are fixed with respect to the image side. When the fourth lens group 400 includes one lens, one lens 410 may be fixed with respect to the image side.

According to the embodiment of the present invention, a filter 20 and an image sensor 10 may be sequentially disposed behind the fourth lens group 400. In this case, the filter 20 may be an infrared (IR) filter. Accordingly, the filter 20 may block near IR light, for example, light of a wavelength of 700 nm to 1100 nm, among light incident on the camera module. In addition, the image sensor 10 may be connected to a printed circuit board through a wire.

The filter 20 may also include a foreign material blocking filter and an IR filter which are sequentially disposed in the direction from the subject side to the image side. When the filter 20 includes the foreign material blocking filter, foreign materials generated while the third lens group 300 moves may be prevented from being introduced to the IR filter or the image sensor 10.

According to movement of the second lens group 200 and the third lens group 300, a magnification of the zoom optical system may change. For example, the magnification of the zoom optical system may continuously increase or decrease by in the range of 5× to 10× according to the movement of the second lens group 200 and the third lens group 300. According to the embodiment, in a wide angle mode, the zoom optical system may have a magnification of 5×, and in the telephoto mode, the zoom optical system may have a magnification of 10×. Meanwhile, the continuous increase or decrease in the magnification does not refer to an intermittent increase or decrease in the magnification in a digital manner but may refer to a linear decrease or decrease therein.

Each of the second lens group 200 and the third lens group 300 may move independently. For example, when the wide angle mode is switched to the telephoto mode, a distance between the second lens group 200 and the third lens group 300 may increase in a direction from a movement start point (wide angle mode start point) to a predetermined point and gradually decrease in a direction from the predetermined point to a movement end point (telephoto mode end point).

An effective focal length (EFL) of the zoom optical system according to the embodiment of the present invention will be described.

The EFL of the zoom optical system in the telephoto mode telephoto may be expressed as in Expression 1 below.

$$11.5 < \frac{EFL_{tele}}{H_{imageD}} < 12.5 \qquad \text{[Expression 1]}$$

Here, $EFL_{tele}$ is the EFL of the zoom optical system in the telephoto mode, and $H_{imageD}$ is a half value of a diagonal length of a pixel area of the image sensor. A unit may be [mm]. The pixel area of the image sensor may be an area in which light-receiving pixels are arrayed in the image sensor. The pixel area of the image sensor may be the area excluding a circuit area in which the received light is converted into an electrical signal, a housing portion, and the like in a total area of the image sensor.

The EFL of the zoom optical system in the wide angle mode may be expressed as in Expression 2 below.

$$5.5 < \frac{EFL_{wide}}{H_{imageD}} < 6.5 \qquad \text{[Expression 2]}$$

Here, $EFL_{wide}$ is the EFL of the zoom optical system in the wide angle mode, and $H_{imageD}$ is the half value of the diagonal length of the pixel area of the image sensor. A movement stroke of the zoom optical system according to the embodiment of the present invention will be described. The movement stroke may refer to a distance to which the lens group is movable by a driving part.

A movement stroke of the second lens group 200 may be expressed as in Expression 3 below.

$$4 < \frac{TTL}{STROKE_2} < 8 \qquad \text{[Expression 3]}$$

Here, TTL (total track length) may be a distance from the surface of the image sensor to a first surface of the zoom optical system. For example, the TTL may be a distance from one surface closest to the subject side in the first lens group 100 to an upper surface of the image sensor 10 on which light is incident. In the present specification, the TTL may be interchangeably used with a total length. $STROKE_2$ may be the movement stroke of the second lens group 200. A unit may be [mm].

A movement stroke of the third lens group 300 may be expressed as in Expression 4 below.

$$4 < \frac{TTL}{STROKE_3} < 8 \qquad \text{[Expression 4]}$$

Here, TTL may be the distance from the surface of the image sensor to the first surface of the zoom optical system. $STROKE_3$ may be the movement stroke of the third lens group 300. A unit may be [mm].

When the movement stroke is large, a size of the driving part for moving the second lens group 200 and the third lens group 300 increases, and accordingly, there is a problem of difficulty in installing in a portable terminal. However, since the movement stroke is implemented in the range of about ⅕ to ⅓ times the TTL, the size of the driving part can be small, and thus the camera module can be miniaturized.

An abbe number of the zoom optical system according to the embodiment of the present invention will be described. The abbe number may be a value obtained by quantifying a light dispersion property of a lens.

Abbe numbers of the plurality of lenses included in the second lens group 200 may be different. When the second lens group 200 includes two lenses, the abbe numbers of two lenses included in the second lens group 200 may be expressed as in Expression 5 below.

$$|ABBE_3 - ABBE_4| > 10 \qquad \text{[Expression 5]}$$

Here, $ABBE_3$ may be an abbe number of the lens disposed at the subject side of two lenses included in the second lens group 200, and $ABBE_4$ may be an abbe number of the lens disposed at the image side of two lenses included in the second lens group 200. According to the embodiment, $ABBE_3$ may be an abbe number of a third lens 210, and $ABBE_4$ may be an abbe number of a fourth lens 220.

In the zoom optical system according to the embodiment of the present invention, a chromatic aberration may be reduced by arranging two lenses of which the abbe numbers are different by a predetermined value or more in the second lens group 200.

An aperture of the lens of the zoom optical system according to the embodiment of the present invention will be described.

According to the embodiment of the present invention, an aperture of each of the second lens group 200 and the third lens group 300 may be smaller than an aperture of each of the first lens group 100 and the fourth lens group 400. This may be expressed as in Expression 6 below.

$$1.1 < \frac{APER_{fix}}{APER_{mov}} < 1.4 \qquad \text{[Expression 6]}$$

Here, $APER_{fix}$ may be a maximum diameter of the lenses included in the first lens group 100 and the fourth lens group 400 which are fixed groups, and $APER_{mov}$ may be a maximum diameter of the lenses included in the second lens group 200 and the third lens group 300 which are moving groups. For example, when a diameter of a first lens 110 is largest among those of the lenses included in the first lens group 100 and the fourth lens group 400 which are the fixed groups, $APER_{fix}$ may be the diameter of the first lens 110. When a diameter of the third lens 210 is largest among those of the lenses included in the second lens group 200 and the third lens group 300 which are the moving groups, $APER_{mov}$ may be the diameter of the third lens 210.

A weight of the second lens group 200 and the third lens group 300 may be reduced by implementing the aperture of the second lens group 200 and the third lens group 300 to be smaller than the aperture of the first lens group 100 and the fourth lens group 400. Accordingly, power consumption can be reduced when the second lens group 200 and the third lens group 300 which are the moving groups move.

According to the embodiment of the present invention, the plurality of lenses included in the first to fourth lens groups 100 to 400 may be lenses to which a D-cut technique is applied. Each of the plurality of lenses included in the first to fourth lens groups 100 to 400 may be a D-cut lens of which a portion of an upper portion and a portion of a lower portion are cut. In this case, ribs and the portions of the upper portions and the lower portions in effective diameters of the plurality of lenses may be cut, or only the ribs thereof may be cut without cutting the effective diameters. According to one embodiment, the second lens group 200 and the third lens group may include the lens in which a value obtained by dividing a length of a long axis of the effective diameter by a length of a short axis of the effective diameter is 1. That is, the length of the long axis of the effective diameter and the length of the short axis of the effective diameter may be the same. For example, in the case of the third lens 210, the fourth lens 220, a fifth lens 310, and a sixth lens 320, only the ribs of the upper portions and lower portions may be cut, and the effective diameters may not be cut. In a circular type lens, there is a problem in that a volume of the lens is increased due to a vertical height thereof, but since the D-cut technology is applied to the upper portions and the lower portions of the plurality of lenses according to the embodiment of the present invention, the vertical height may be decreased so that the volume of the lenses may be decreased.

According to the embodiment of the present invention, the first lens group 100 may include the plurality of lenses having different refractive power. Among the plurality of lenses included in the first lens group 100, the lens disposed at the image side may have positive (+) refractive power. Among the plurality of lenses included in the first lens group 100, the lens disposed at the subject side may have negative (+) refractive power. According to the embodiment, the first lens group 100 may include the first lens 110 and a second lens 120 which are sequentially disposed in the direction from the subject side to the image side. Among them, the first lens 110 may have positive refractive power, and the second lens 120 may have negative refractive power.

According to the embodiment of the present invention, the first to fourth lens groups 100 to 400 may include plastic lenses. For example, all the plurality of lenses included in the fourth lens group 400 may be formed of plastic materials or glass materials. The fourth lens group 400 may include a glass lens. For example, among the plurality of lenses included in the fourth lens group 400, the lens disposed at the subject side may be formed of the glass material, and the lens disposed at the image side may be formed of the plastic material. In this case, the glass lens may be a glass mold lens manufactured in a glass mold manner.

According to the embodiment of the present invention, in the zoom optical system, a chief ray angle (CRA) may be greater than −10° and smaller than 10°. An incident angle of light on the image sensor 10, that is, the upper surface, may be greater than −10° and smaller than 10°. That is, the CRA of the zoom optical system according to the embodiment of the present invention may have any one value among values between −10° to 10°. Since an incident angle of light on the image sensor 10 is small, a degree of freedom for selecting a sensor can be improved, and the zoom optical system having a compact size can be obtained.

FIG. 2A is a cross-sectional view of the zoom optical system in the wide angle mode according to the embodiment of the present invention, FIG. 2B is a cross-sectional view of the zoom optical system in the middle mode according to the embodiment of the present invention, and FIG. 2C is a cross-sectional view of the zoom optical system in the telephoto mode according to the embodiment of the present invention.

Tables 1 and 2 below show optical properties of the lenses included in the zoom optical system according to the embodiment of the present invention, and Tables 3 and 4 show Koenig constants and aspheric coefficients of the lenses included in the zoom optical system according to the embodiment of the present invention.

TABLE 1

| Lens No. | Lens surface No. | Radius of Curvature (R, mm) | Thickness (mm) | Material | Refractive Index |
|---|---|---|---|---|---|
| First Lens | 112 | 7.42245092 | 1.97362944 | Plastic | 1.66134 |
|  | 114 | 49.31590248 | 2.082822984 |  |  |
| Second Lens | 122 | −124.0409329 | 1 | Plastic | 1.67134 |
|  | 124 | 4.815611127 | 5.710263206(2.806912311, 0.20028764) |  |  |
| Third Lens | 212 | 4.616306343 | 2.247298365 | Plastic | 1.54408 |
|  | 214 | −4.463980269 | 0.2 |  |  |
| Fourth Lens | 222 | −5.124947342 | 2 | Plastic | 1.67134 |
|  | 224 | −8.385590704 | 0.674684273(0.310740064, 0.2) |  |  |
| Fifth Lens | 312 | −634.5886811 | 1.55415146 | Plastic | 1.54408 |
|  | 314 | 7.078785422 | 1.179802065 |  |  |
| Sixth Lens | 322 | −16.26842968 | 1.002238235 | Plastic | 1.54408 |
|  | 324 | 5.154984909 | 1.237063216(4.50435832, 7.221723054) |  |  |
| Seventh Lens | 412 | −13.25096355 | 0.667336888 | Glass Mold | 1.85135 |
|  | 414 | 13.95039874 | 0.3 |  |  |
| Eighth Lens | 422 | 7.858670469 | 2.658209637 | Plastic | 1.67134 |
|  | 424 | −4.591793946 | 0.2 |  |  |
| Filter | 22 | 1E+18 | 0.340277838 |  |  |
|  | 24 | 1E+18 | 0.972222394 |  |  |
| Sensor | 10 | 1E+18 | 0 |  |  |

TABLE 2

| Lens No. | Lens Surface No. | Abbe Number | Shape | Semi-aperture |
|---|---|---|---|---|
| First Lens | 112 | 20.37 | Convex | 3.3 |
| | 114 | | Convex | 3.022139604 |
| Second Lens | 122 | 19.24 | Concave | 2.521031035 |
| | 124 | | Convex | 2.368990701 |
| Third Lens | 212 | 56.17 | Convex | 2.4 |
| | 214 | | Concave | 2.4 |
| Fourth Lens | 222 | 19.24 | Concave | 2.296715617 |
| | 224 | | Concave | 2.214224529 |
| Fifth Lens | 312 | 56.17 | Convex | 2.071201808 |
| | 314 | | Convex | 1.878704659 |
| Sixth Lens | 322 | 56.17 | Concave | 1.764515869 |
| | 324 | | Convex | 1.976714601 |
| Seventh Lens | 412 | 40.1 | Concave | 2.641459484 |
| | 414 | | Convex | 3.070686289 |
| Eighth Lens | 422 | 19.24 | Convex | 3.359693539 |
| | 424 | | Concave | 3.50734391 |
| Filter | 22 | | | 3.195463733 |
| | 24 | | | 3.140429724 |
| Sensor | 10 | | | 2.903552314 |

TABLE 3

| Lens Surface No. | Koenig Constant (K) | A | B | C | D |
|---|---|---|---|---|---|
| 112 | 0 | 0.000293737 | 6.95524E−06 | −2.04886E−07 | 2.54133E−08 |
| 114 | 0 | 0.000625781 | −1.98889E−05 | −5.90125E−07 | 9.10657E−08 |
| 122 | 0 | −0.00303865 | 7.41528E−05 | 3.38744E−06 | 2.32426E−07 |
| 124 | 0 | −0.004642737 | 0.000100784 | 1.06259E−05 | −6.51357E−07 |
| 212 | 0 | −0.000672328 | −7.33028E−05 | −1.54612E−05 | −1.68735E−06 |
| 214 | 0 | 0.003599099 | −3.27895E−05 | −2.03348E−05 | 4.30616E−08 |
| 222 | 0 | 0.000914868 | 0.000290656 | 6.07841E−07 | 1.13285E−06 |
| 224 | 0 | 0.001230947 | 0.000155511 | 2.25242E−05 | −3.34835E−06 |
| 312 | 0 | 0.000830232 | 0.00022879 | −9.45614E−05 | 1.53938E−05 |
| 314 | 0 | −0.010676313 | 0.000592962 | −0.000318687 | 4.4005E−05 |
| 322 | 0 | −0.040211004 | 0.002806002 | −0.000352148 | 9.76791E−05 |
| 324 | 0 | −0.029111039 | 0.005185642 | −0.000539334 | 3.75913E−05 |
| 412 | 0 | −0.006673112 | −0.000456779 | −6.89284E−07 | 1.12705E−05 |
| 414 | 0 | −0.00648599 | −0.000269829 | 9.9912E−06 | 2.44288E−06 |
| 422 | 0 | −0.001856843 | 0.000387894 | −3.92728E−05 | 2.47402E−07 |
| 424 | 0 | 0.000832702 | 0.000564575 | −6.36048E−06 | −1.38964E−06 |

TABLE 4

| Lens Surface No. | E | F | G | H | J |
|---|---|---|---|---|---|
| 112 | −2.15666E−10 | 1.6379E−10 | 0 | 0 | 0 |
| 114 | 8.9785E−09 | −2.365E−10 | 0 | 0 | 0 |
| 122 | 1.92498E−08 | −4.04404E−09 | 0 | 0 | 0 |
| 124 | −9.87068E−09 | 9.44622E−10 | 0 | 0 | 0 |
| 212 | 1.88101E−07 | −6.98355E−08 | 0 | 0 | 0 |
| 214 | −6.59668E−08 | −6.58479E−09 | 0 | 0 | 0 |
| 222 | 1.06861E−07 | −5.29812E−10 | 0 | 0 | 0 |
| 224 | 7.79089E−07 | −5.16153E−08 | 0 | 0 | 0 |
| 312 | −6.77597E−07 | 5.2442E−08 | 0 | 0 | 0 |
| 314 | 1.30454E−06 | −1.33203E−15 | 0 | 0 | 0 |
| 322 | 6.25312E−15 | 2.04106E−16 | 0 | 0 | 0 |
| 324 | −6.71573E−14 | −1.49767E−15 | 0 | 0 | 0 |
| 412 | −1.33473E−07 | −9.2372E−08 | 0 | 0 | 0 |
| 414 | −5.97115E−08 | −1.14911E−08 | 0 | 0 | 0 |
| 422 | 2.02276E−07 | −1.34349E−08 | 0 | 0 | 0 |
| 424 | −1.05608E−07 | 7.32181E−09 | 0 | 0 | 0 |

Referring to FIGS. 2A to 2C and Tables 1 to 4, the zoom optical system includes the first lens group 100, the second lens group 200, the third lens group 300, and the fourth lens group 400 which are sequentially arranged in the direction from the subject side to the image side. The first lens group 100 includes the first lens 110 and the second lens 120 which are sequentially arranged in the direction from the subject side to the image side. The second lens group 200 includes the third lens 210 and the fourth lens 220 which are sequentially arranged in the direction from the subject side to the image side. The third lens group 300 includes the fifth lens 310 and the sixth lens 320 which are sequentially arranged in the direction from the subject side to the image side. The fourth lens group 400 includes a seventh lens 410 and an eighth lens 420. In Table 1, a thickness (mm) denotes a distance from a lens surface to the next lens surface.

For example, a thickness written to correspond to a subject side surface 112 of the first lens 110 denotes a distance from the subject side surface 112 to an image side surface 114 of the first lens 110. Specifically, the thickness written to correspond to the subject side surface 112 of the first lens 110 denotes a distance between a curvature center of the subject side surface 112 and a curvature center of the image side surface 114 in the first lens 110.

A thickness written to correspond to the image side surface 114 of the first lens 110 denotes a distance from the image side surface 114 of the first lens 110 to a subject side surface 122 of the second lens 120. Specifically, the thickness written to correspond to the image side surface 114 of the first lens 110 denotes a distance between the curvature center of the image side surface 114 of the first lens 110 and a curvature center of the subject side surface 122 of the second lens 120.

A thickness written to correspond to an image side surface 124 of the second lens 120 denotes a distance from the image side surface 124 of the second lens 120 to a subject side surface 212 of the third lens 210. Specifically, the thickness written to correspond to the image side surface 124 of the second lens 120 denotes a distance between a curvature center of the image side surface 124 of the second lens 120 and a curvature center of the subject side surface 212 of the third lens 210.

In this case, since the second lens group 200 moves in a process of zooming from the wide angle mode to the telephoto mode, the thickness written to correspond to the image side surface 124 of the second lens 120 may change. The thickness written to correspond to the image side surface 124 of the second lens 120 may have a value between a shortest distance and a longest distance. Referring to Table 1, the thickness written to correspond to the image side surface 124 of the second lens 120 in the wide angle mode may have the longest distance (5.710263206). The thickness written to correspond to the image side surface 124 of the second lens 120 in the middle mode may have a value (2.806912311) between the shortest distance and the longest distance. The thickness written to correspond to the image side surface 124 of the second lens 120 in the telephoto mode may have the shortest distance (0.20028764). The thickness written to correspond to the image side surface 124 of the second lens 120 is the same as a thickness written to correspond to an image side surface 224 of the fourth lens 220 and a thickness written to correspond to an image side surface 324 of the sixth lens 320.

Referring to Table 1, it may be seen that a difference value between abbe numbers of the third lens 210 and the fourth lens 220 included in the second lens group 200 is 10 or more. Specifically, since the abbe number of the third lens 210 is 56.17, and the abbe number of the fourth lens 220 is 19.24, the difference value between the abbe numbers of two lenses is about 37, and thus it may be seen that the difference value is 10 or more.

Referring to Table 1, it may be seen that any one of the seventh lens 410 and the eighth lens 420 included in the fourth lens group 400 is the glass lens. Specifically, it may be seen that the seventh lens 410 is the glass mold lens, and the eighth lens 420 is the plastic lens.

Referring to Table 2, each of surfaces of the first to eighth lens 110 to 420 may be formed in a convex or concave shape.

The first lens 110 may be a lens of which the subject side surface 112 is convex toward the subject side. The first lens 110 may be the lens of which the image side surface 114 is convex toward the subject side. The second lens 120 may be a lens of which the subject side surface 122 is concave toward the subject side. The second lens 120 may be the lens of which the image side surface 124 is convex toward the subject side.

The third lens 210 may be a lens of which the subject side surface 212 is convex toward the subject side. The third lens 210 may be the lens of which an image side surface 214 is concave toward the subject side. The fourth lens 220 may be a lens of which a subject side surface 222 is concave toward the subject side. The fourth lens 220 may be the lens of which the image side surface 224 is concave toward the subject side. Meanwhile, when a distance between the first lens group 100 and the second lens group 200 is a minimum distance (that is, in the telephoto mode), the curvature center of the subject side surface 212 of the third lens 210 may be positioned closer to the image side than two ends of the image side surface 124 of the second lens 120.

The fifth lens 310 may be a lens of which a subject side surface 312 is convex toward the subject side. The fifth lens 310 may be the lens of which an image side surface 314 is convex toward the subject side. The sixth lens 320 may be a lens of which a subject side surface 322 is concave toward the subject side. The sixth lens 320 may be the lens of which the image side surface 324 is convex toward the subject side.

The seventh lens 410 may be a lens of which a subject side surface 412 is concave toward the subject side. The seventh lens 410 may be the lens of which an image side surface 414 is convex toward the subject side. The eighth lens 420 may be a lens of which a subject side surface 422 is convex toward the subject side. The eighth lens 420 may be the lens of which an image side surface 424 is concave toward the subject side.

Referring to FIG. 2A, when the distance between the first lens group 100 and the second lens group 200 is d1a, the distance between the second lens group 200 and the third lens group 300 is d2a, and a distance between the third lens group 300 and the fourth lens group 400 is d3a, the zoom optical system may enter the wide angle mode (for example, a magnification of 5×). That is, when a distance between the curvature center of the image side surface 124 of the second lens 120 and the curvature center of the subject side surface 212 of the third lens 210 is d1a, a distance between a curvature center of the image side surface 224 of the fourth lens 220 and a curvature center of the subject side surface 312 of the fifth lens 310 is d2a, and a distance between a curvature center of the image side surface 324 of the sixth lens 320 and a curvature center of the subject side surface 412 of the seventh lens 410 is d3a, the zoom optical system may enter the wide angle mode.

In FIG. 2B, when the distance between the first lens group 100 and the second lens group 200 is d1b, the distance between the second lens group 200 and the third lens group 300 is d2b, and the distance between the third lens group 300 and the fourth lens group 400 is d3b, the zoom optical system may enter the middle mode. That is, when the distance between the curvature center of the image side surface 124 of the second lens 120 and the curvature center of the subject side surface 212 of the third lens 210 is d1b, the distance between the curvature center of the image side surface 224 of the fourth lens 220 and the curvature center of the subject side surface 312 of the fifth lens 310 is d2b, and the distance between the curvature center of the image side surface 324 of the sixth lens 320 and the curvature center of the subject side surface 412 of the seventh lens 410 is d3b, the zoom optical system may enter the middle mode.

In FIG. 2C, when the distance between the first lens group 100 and the second lens group 200 is d1c, the distance between the second lens group 200 and the third lens group 300 is d2c, and the distance between the third lens group 300 and the fourth lens group 400 is d3c, the zoom optical system may enter the telephoto mode (for example, a magnification of 10×). That is, when the distance between the curvature center of the image side surface 124 of the second lens 120 and the curvature center of the subject side surface 212 of the third lens 210 is d1c, a distance between the curvature center of the image side surface 224 of the fourth lens 220 and the curvature center of the subject side surface 312 of the fifth lens 310 is d2c, and a distance between the curvature center of the image side surface 324 of the sixth lens 320 and the curvature center of the subject side surface 412 of the seventh lens 410 is d3c, the zoom optical system may enter the telephoto mode.

In a process of changing a magnification from the wide angle mode to the telephoto mode, a distance between the adjacent lens groups may change.

The distance between the first lens group 100 and the second lens group 200 may continuously change from d1a to d1b and from d1b to d1c. Referring to Table 1, in the wide angle mode, the distance d1a between the first lens group 100 and the second lens group 200 is 5.710263206 [mm]. In the middle mode, the distance d1b between the first lens group 100 and the second lens group 200 is 2.806912311 [mm]. In the telephoto mode, the distance d1c between the first lens group 100 and the second lens group 200 is 0.20028764 [mm]. As described above, in the process of continuously changing the magnification from the wide angle mode to the middle mode and from the middle mode to the telephoto mode, the distance between the first lens group 100 and the second lens group 200 may continuously change from 5.710263206 [mm] to 2.806912311 [mm] and from 2.806912311 [mm] to the 0.20028764 [mm]. That is, in the process of continuously changing the magnification from the wide angle mode to the telephoto mode, the distance between the first lens group 100 and the second lens group 200 may gradually decrease (d1a>d1b>d1c). That is, in the process of continuously changing the magnification from the wide angle mode to the telephoto mode, an increase in the distance between the first lens group 100 and the second lens group 200 may gradually decrease.

The distance between the second lens group 200 and the third lens group 300 may continuously change from d2a to d2b and from d2b to d2c. Referring to Table 1, in the wide angle mode, the distance d2a between the second lens group 200 and the third lens group 300 is 0.674684273 [mm]. In the middle mode, the distance d2b between the second lens group 200 and the third lens group 300 is 0.310740064 [mm]. In the telephoto mode, the distance d1c between the second lens group 200 and the third lens group 300 is 0.2 [mm]. As described above, in the process of continuously changing the magnification from the wide angle mode to the middle mode and from the middle mode to the telephoto mode, the distance between the second lens group 200 and the third lens group 300 may continuously change from 0.674684273 [mm] to 0.310740064 [mm] and from 0.310740064 [mm] to 0.2 [mm]. That is, in the process of continuously changing the magnification from the wide angle mode to the telephoto mode, the distance between the second lens group 200 and the third lens group 300 may decrease (d2a>d2b>d2c). In this case, in the process of continuously changing the magnification from the wide angle mode to the telephoto mode, an increase in the distance between the second lens group 200 and the third lens group 300 may decrease.

The distance between the third lens group 300 and the fourth lens group 400 may continuously change from d3a to d3b and from d3b to d3c. Referring to Table 1, in the wide angle mode, the distance d3a between the third lens group 300 and the fourth lens group 400 is 1.237063216 [mm]. In the middle mode, the distance d3b between the third lens group 300 and the fourth lens group 400 is 4.50435832 [mm]. In the telephoto mode, the distance d3c between the third lens group 300 and the fourth lens group 400 is 7.221723054 [mm]. As described above, in the process of continuously changing the magnification from the wide angle mode to the middle mode and from the middle mode to the telephoto mode, the distance between the third lens group 300 and the fourth lens group 400 may continuously change from 1.237063216 [mm] to 4.50435832 [mm] and from 4.50435832 [mm] to 7.221723054 [mm]. That is, in the process of continuously changing the magnification from the wide angle mode to the telephoto mode, the distance between the third lens group 300 and the fourth lens group 400 may gradually increase (d3a<d3b<d3c). However, in the process of continuously changing the magnification from the wide angle mode to the telephoto mode, an increase in the distance between the third lens group 300 and the fourth lens group 400 may gradually decrease.

As described above, a moving speed of the second lens group 200 and a moving speed of the third lens group 300 may be different from each other.

By moving the second lens group 200 and the third lens group 300, the magnification of the zoom optical system may be continuously changed from a magnification of 5× to a magnification of 10×.

Then, a simulation result of a longitudinal spherical aberration, an astigmatic field curve, and a distortion of the zoom optical system according to the embodiment of the present invention will be described with reference to FIGS. 3A to 3C. The longitudinal spherical aberration refers to a longitudinal spherical aberration according to each wavelength, the astigmatic field curve refers to an aberration property of a tangential plane and a sagittal plane according to a height of an image surface, and the distortion refers to a distortion degree according to the height of the image surface.

FIG. 3A is a graph showing longitudinal spherical aberrations, astigmatic field curves, and a distortion of light of wavelengths of 435 nm, 486 nm, 546 nm, 587 nm, and 656 nm in the optical system in the wide angle mode according to the embodiment.

FIG. 3B is a graph showing the longitudinal spherical aberrations, the astigmatic field curves, and the distortion of light of wavelengths of 435 nm, 486 nm, 546 nm, 587 nm, and 656 nm in the optical system in the middle mode according to the embodiment.

FIG. 3C is a graph showing the longitudinal spherical aberrations, the astigmatic field curves, and the distortion of light of wavelengths of 435 nm, 486 nm, 546 nm, 587 nm, and 656 nm in the optical system in the telephoto mode according to the embodiment.

Referring to FIGS. 3A to 3C, it may be seen that the longitudinal spherical aberration from a center to an end of the image sensor is in the range of −0.05 [mm] to 0.1 [mm] regardless of the wavelength. Specifically, in the wide angle mode, the longitudinal spherical aberration is in the range of about −0.04 [mm] to 0.04 [mm], and in the middle mode, the longitudinal spherical aberration is in the range of −0.03 [mm] to 1 [mm]. In the telephoto mode, the longitudinal spherical aberration is in the range of −0.05 [mm] to 0.05 [mm] except a wavelength of 435 [nm] even when the wavelength of 435 [nm] is beyond the range.

Referring to FIGS. 3A to 3C, it may be seen that the astigmatic field curve from the center to the end of the image sensor is in the range of −0.04 [mm] to 0.01 [mm] regardless of the wavelength. Specifically, it may be seen that, in the wide angle mode, the astigmatic field curve is in the range of about −0.02 [mm] to 0 [mm], and in the middle mode, the astigmatic field curves is in the range of −0.02 [mm] to 0.01 [mm]. It may be seen that, in the telephoto mode, the astigmatic field curve is in the range of about −0.04 [mm] to 0 [mm].

Referring to FIGS. 3A to 3C, it may be seen that the distortion from the center to the end of the image sensor is in the range of −2[%] to 0[%] regardless of the wavelength. Specifically, it may be seen that, in the wide angle mode, the distortion is in the range of about −1[%] to 0 [%], and in the middle mode, the distortion is in the range of −1.5[%] to 0[%]. It may be seen that, in the telephoto mode, the distortion is in the range of −2[%] to 0[%].

Then, a modulation transfer function (MTF) simulation result of the zoom optical system according to the embodiment of the present invention will be described with reference to FIGS. 4A to 4C. The MTF is one of performance measurement methods of an optical system.

FIG. 4A is a graph showing a diffraction MTF in the optical system in the wide angle mode according to the embodiment. FIG. 4B is a graph showing the diffraction MTF in the optical system in the middle mode according to the embodiment. FIG. 4C is a graph showing the diffraction MTF in the optical system in the telephoto mode according to the embodiment.

Referring to FIGS. 4A to 4C, it may be seen that the zoom optical system according to the embodiment of the present invention has a value close to a diffraction limit, which is a limiting value, at around a defocusing position of 0 [mm] in each of the wide angle mode, the middle mode, and the telephoto mode.

FIG. 5 is a graph showing a relative illumination of the zoom optical system according to the embodiment of the present invention.

Referring to FIG. 5, it may be seen that, in the zoom optical system according to the embodiment of the present invention, the relative illumination value is 50% or more in all region in the wide angle mode (zoom position 1), the middle mode (zoom position 2), and the telephoto mode (zoom position 3). It may be seen that, in all region in the middle mode and the telephoto mode, the relative illumination value is 80% or more, and in the case of the wide angle mode, the relative illumination value in the range of 0 to 1.6 [mm] is 80% or more.

As described above with reference to the embodiments, it may be seen that the optical system according to the embodiment of the present invention has high aberration properties.

Meanwhile, the zoom optical system according to the embodiment of the present invention may be applied to a camera module. The camera module including the zoom optical system according to one embodiment of the present invention may be installed in the portable terminal and applied thereto with a main camera module. The camera module according to the embodiment of the present invention may include an image sensor, a filter disposed on the image sensor, and a zoom optical system disposed on the filter, and the zoom optical system according to the embodiment of the present invention may include the first lens group 100, the second lens group 200, the third lens group 300, and the fourth lens group 400 which are described above. The portable terminal, in which the camera module including the zoom optical system according to the embodiment of the present invention is installed, may be a smartphone, a tablet personal computer (PC), a laptop computer, a personal digital assistant (PDA), or the like. The optical system according to the embodiment of the present invention can be applied to a camera module.

FIG. 6 is a view of a part of a portable terminal to which a camera module according to one embodiment of the present invention is applied.

Referring to FIG. 6, a camera module including a zoom optical system 1000 according to one embodiment of the present invention may be installed in the portable terminal and may be applied thereto along with a main camera module 1100.

The zoom optical system 1000 according to the embodiment of the present invention may include a first lens group 100, a second lens group 200, a third lens group 300, and a fourth lens group 400 which are described above, and the first lens group 100, the second lens group 200, the third lens group 300, and the fourth lens group 400 may be sequentially disposed in a lateral direction of the portable terminal due to a limit of a thickness of the portable terminal. To this end, as described above, a right-angled prism may be further disposed in front of the first lens group 100. When the zoom optical system is disposed in a thickness direction of the portable terminal, that is, the lens surfaces of the lenses included in the zoom optical system are disposed in the thickness direction of the portable terminal, diameters of the lenses included in the zoom optical system may decrease to decrease the thickness of the portable terminal. Accordingly, the zoom optical system capable of continuously adjusting a magnification by moving the lenses can be installed even in the portable terminal.

The portable terminal, in which the camera module including the zoom optical system according to the embodiment of the present invention is installed, may be a smartphone, a tablet PC, a laptop computer, a PDA, or the like.

While the present invention has been mainly described above with reference to embodiments, it will be understood by those skilled in the art that the invention is not limited to the embodiments, but the embodiments are only exemplary, and various modifications and applications which are not illustrated above may be made within the range without departing from the essential features of the present embodiments. For example, components specifically described in the embodiments may be modified and implemented. In addition, it should be interpreted that differences related to modifications and applications fall within the scope of the present invention defined by the appended claims.

The invention claimed is:

1. A zoom optical system comprising a first lens group, a second lens group, a third lens group, and a fourth lens group which are sequentially arranged in a direction from a subject side to an image side,
   wherein each of the first lens group to the fourth lens group includes at least two lenses,
   wherein the second lens group and the third lens group are movable,
   wherein an effective focal length (EFL) in a wide angle mode is defined by an expression below, $$5.5 < \frac{EFL_{wide}}{H_{imageD}} < 6.5, \text{ and}$$

here, $EFL_{wide}$ is the EFL of the zoom optical system in the wide angle mode, $Himage_D$ is a half value of a diagonal length of a pixel area of an image sensor, and the pixel area of the image sensor is an area in which light-receiving pixels are arrayed in the image sensor which is located at an image plane behind the fourth lens group,
   wherein, when zooming is performed from the wide angle mode to a telephoto mode, a movement stroke of the third lens group is defined by an expression below, $$4 < \frac{TTL}{STROKE_3} < 8,$$

here, TTL (total track length) is a distance from a surface of the image sensor to a first surface of the zoom optical system, and $STROKE_3$ is the movement stroke of the third lens group.

2. The zoom optical system of claim 1, wherein, when zooming is performed from the wide angle mode to the telephoto mode, a movement stroke of the second lens group is defined by an expression below, $$4 < \frac{TTL}{STROKE_2} < 8,$$

here, $STROKE_2$ is the movement stroke of the second lens group.

3. The zoom optical system of claim 1, wherein:
   a lens disposed at the image side of the at least two lenses included in the first lens group has positive refractive power; and a lens disposed at the subject side of the at least two lenses included in the first lens group has negative refractive power.

4. The zoom optical system of claim 3, wherein, the at least two lenses included in the second lens group have abbe numbers defined by an expression below, $$|ABBE_3 - ABBE_4| > 10,$$

here, $ABBE_3$ is an abbe number of a lens disposed at the subject side of the at least two lenses included in the second lens group, and $ABBE_4$ is an abbe number of a lens disposed at the image side of the at least two lenses included in the second lens group.

5. The zoom optical system of claim 4, wherein the at least two lens included in the second lens group includes at least one of:
a glass lens; and
a plastic lens.

6. The zoom optical system of claim 1, wherein a maximum diameter of the at least two lenses included in the first lens group and the fourth lens group and a maximum diameter of the at least two lenses included in the second lens group and the third lens group are defined by an expression below, $$1.1 < \frac{APER_{fix}}{APER_{mov}} < 1.4,$$

here, $APER_{fix}$ is the maximum diameter of the at least two lenses included in the first lens group and the fourth lens group which are fixed groups, and $APER_{mov}$ is the maximum diameter of the at least two lenses included in the second lens group and the third lens group which are moving groups.

7. The zoom optical system of claim 1, wherein the second lens group and the third lens group have different moving speeds.

8. The zoom optical system of claim 1, wherein a filter and the image sensor are sequentially disposed at a rear end of the fourth lens group.

9. The zoom optical system of claim 1, wherein the at least two lenses of the first lens group includes first and second lenses, the at least two lenses of the second lens group includes third and fourth lenses, the at least two lenses of the third lens group includes fifth and sixth lenses, and the at least two lenses of the fourth lens group includes seventh and eighth lenses.

10. The zoom optical system of claim 4, wherein at least one of the lenses of the at least two lenses included in each of the first lens group to the fourth lens group has the upper portions and the lower portions have partially cut ribs and effective diameters or have only cut ribs without cutting the effective diameters.

11. The zoom optical system of claim 1, wherein the at least two lenses of the second lens group and the third lens group include lenses in which value obtained by dividing a long axis length of the effective diameter by a short axis length of the effective diameter is 1.

12. The zoom optical system of claim 1, wherein at least one of the at least two lenses included in each of the first lens group to the fourth lens group is a D-cut lens.

13. The zoom optical system of claim 1, wherein a magnification continuously increase or decrease by in a range of 5× to 10× according to a movement of the second lens group and the third lens group.

14. The zoom optical system of claim 1, wherein an aperture of each of the second lens group and the third lens group is smaller than an aperture of each of the first lens group and the fourth lens group.

15. The zoom optical system of claim 9, wherein the third lens, the fourth lens, the fifth lens, and the sixth lens, ribs of upper portions and lower portions are cut, and effective diameters are not cut.

16. The zoom optical system of claim 1, wherein an EFL in the telephoto mode is defined by an expression below, $$11.5 < \frac{EFL_{tele}}{H_{imageD}} < 12.5,$$

here, $EFL_{tele}$ is the EFL of the zoom optical system in the telephoto mode.

* * * * *